(12) United States Patent
Cook

(10) Patent No.: US 6,650,888 B1
(45) Date of Patent: Nov. 18, 2003

(54) VALIDATING A TRANSACTION WITH USER VOICE AUTHENTICATION USING WIRELESS COMMUNICATIONS

(75) Inventor: Fred S. Cook, Olathe, KS (US)

(73) Assignee: Sprint Communications Company, L.P., Overland Park, KS (US)

(*) Notice: Subject to any disclaimer, the term of this patent is extended or adjusted under 35 U.S.C. 154(b) by 0 days.

(21) Appl. No.: 09/578,635

(22) Filed: May 25, 2000

(51) Int. Cl.[7] .................. H04M 1/66; H04M 1/68; H04M 3/16
(52) U.S. Cl. .................. 455/410; 455/411; 705/67; 705/75; 379/88.02; 379/114.14
(58) Field of Search .................. 455/406, 407, 455/408, 410, 411, 412, 517, 563; 705/67, 75; 379/189, 88.02, 114.14, 145

(56) References Cited

U.S. PATENT DOCUMENTS 5,388,148 A * 2/1995 Seiderman .................. 455/404
5,870,723 A * 2/1999 Pare et al. .................. 705/39
6,040,783 A * 3/2000 Houvener et al. .......... 340/5.53
6,195,568 B1 * 2/2001 Irvin .......................... 455/563
6,213,391 B1 * 4/2001 Lewis ......................... 235/380
6,401,066 B1 * 6/2002 McIntosh ................... 704/273
6,442,532 B1 * 8/2002 Kawan ....................... 705/35

* cited by examiner

Primary Examiner—Edward F. Urban
Assistant Examiner—Simon Nguyen

(57) ABSTRACT

A system comprises a wireless interface coupled to a transaction manager. The wireless interface receives user information, including a user speech sample and a user account code, from a wireless communication device over a wireless communication link. The transaction manager transfers the user speech sample and the user account code to a validation system. The transaction manager receives and displays validation information from the validation system. The validation information indicates if the user is authentic and if the account code is valid. The validation information may include a picture of the user that is displayed by the transaction manager.

28 Claims, 10 Drawing Sheets

SERVER 124

DATA STRUCTURE 324

| POSITION | DEVICE | USER | INFO | TIME OUT | RESPONSE | SERVICE |
|----------|--------|------|------|----------|----------|---------|
| X1Y1 | * | * | 100 | 2 | A | MAP |
| X1Y1 | 7020 | BILL | 283 | 5 | A | MOVIE LIST |
| X1Y1 | 7020 | ANN | 342 | 5 | C | SALES |
| X2Y2 | * | * | 203 | 2 | A | FOOD MENU |
| * | * | JIM | 350 | NO | B | SECURITY |
| * | 8432 | * | 400 | NO | YES | WEB |
| * | 8458 | * | 500 | NO | YES | PSTN |

FIG. 3

VALIDATING A TRANSACTION WITH USER VOICE AUTHENTICATION USING WIRELESS COMMUNICATIONS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of wireless communications, and in particular, to a system that validates a transaction with user voice authentication using wireless communications.

2. Description of the Prior Art

Enterprise communication systems are prevalent in most parts of the world. An enterprise communication system provides voice and data transfer within the enterprise and typically includes an intranet that allows for web-like interaction among enterprise personnel. The enterprise communication system also provides public telephone, Internet, and private data connectivity to the enterprise.

Wireless communications between wireless phones and wireless communication systems is also prevalent in most parts of the world. The wireless communications include voice conversations, e-mail, and web sessions. Some wireless communication systems use push technology to select and provide information to the wireless phones.

Wireless transceivers that interface with wireless phones and with public wireless base stations are being developed for private use. Unfortunately, these wireless transceivers have not been effectively used to provide an interface between wireless phones and enterprise communication systems. Systems are needed that allow wireless phones to more effectively inter-operate with enterprise communication systems. This inadequate interface between wireless phones and enterprise communication systems becomes an acute problem when the wireless phone is used by a visitor to the enterprise who may need more or different information than enterprise personnel.

These wireless transceivers face additional problems. Manual engineering is required to initially configure the transceivers to use the appropriate frequencies and signal strengths. Signal strength is especially critical with dense concentrations of spread spectrum systems because the signal represents noise to neighboring transceivers. Many enterprises or residence do not have the available engineering prowess to properly configure their transceivers.

Technology has been developed to configure a computer for external communications when it is booted. The computer's CPU scans a range of memory addresses that are assigned to peripheral device interfaces. The CPU then installs the appropriate drivers for each interface that was detected to configure the computer for external communications. Such technology has not been applied effectively to wireless transceiver configuration.

Since, many residences or enterprises cannot properly configure their transceivers, it is likely that the unauthorized use of frequencies and signal strengths will be a problem. Untrained users are likely to adjust or move their transceiver without regard to neighboring systems. Systems are needed to counter this problem.

Transactions, such as purchases, are the key activity in many enterprises. Two important aspects of a transaction are user authentication and account code validation. Typically, user authentication is handled by a credit card with a user name and a transaction receipt with a user signature. Photographic identification, personal identification numbers, and voice recognition systems are also used to authenticate users. Account code validation is typically handled by point-of-sale terminals that request account code validation from a bank network. Unfortunately, credit cards are stolen and signatures are forged to defeat user authentication. Systems are needed that integrate effective user authentication into the enterprise systems described above.

SUMMARY OF THE INVENTION

The invention solves the above problems with a system that validates a transaction with user voice authentication using wireless communications. Advantageously, wireless phone users are able to authenticate themselves and their account numbers in a secure manner to facilitate a transaction. Credit cards that can be stolen are not needed. Since authentication is by user voice, theft of the phone does not compromise account security.

The system comprises a wireless interface coupled to a transaction manager. The wireless interface receives user information, including a user speech sample and a user account code, from a wireless communication device over a wireless communication link. In some examples of the invention, the wireless communication device is a wireless telephone that stores the account code and provides user prompts to facilitate the transaction. The transaction manager transfers the user speech sample and the user account code to a validation system.

In response to the user speech sample and the user account code, the validation system generates validation information that indicates if the user is authentic and if the account code is valid. In some examples of the invention, the validation information includes a picture of the user. The validation system transfers the validation information to the transaction system. The transaction manager receives and displays validation information.

BRIEF DESCRIPTION OF THE DRAWINGS

The same reference number represents the same element on all drawings.

FIG. 3 is a table diagram that illustrates a data structure for wireless enterprise communications in an example of the invention.

DETAILED DESCRIPTION OF THE PREFERRED EMBODIMENT

Figure 1:
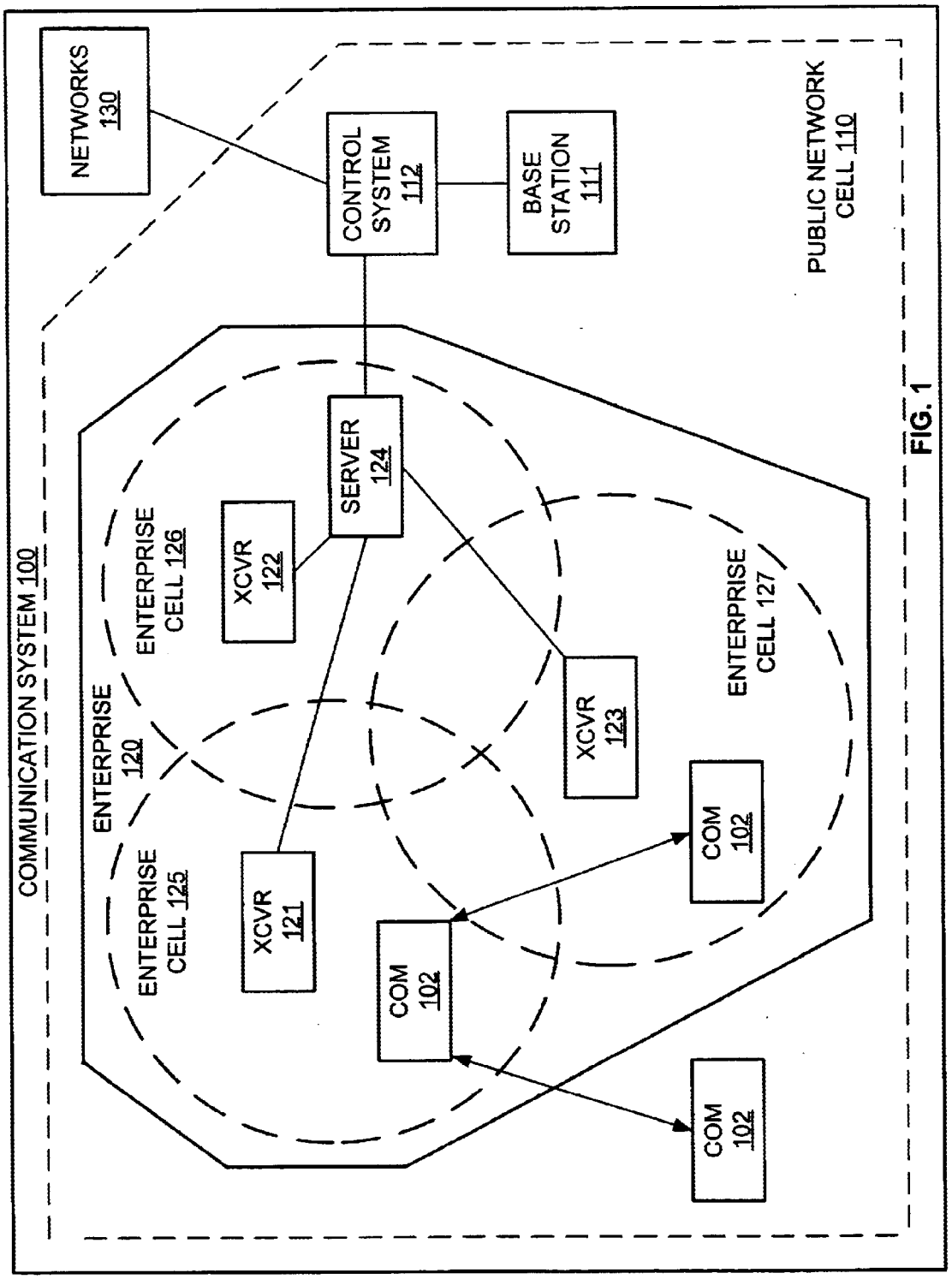
FIG. 1 is a block diagram that illustrates a communication system for wireless enterprise communications in an example of the invention.
Figure 2:
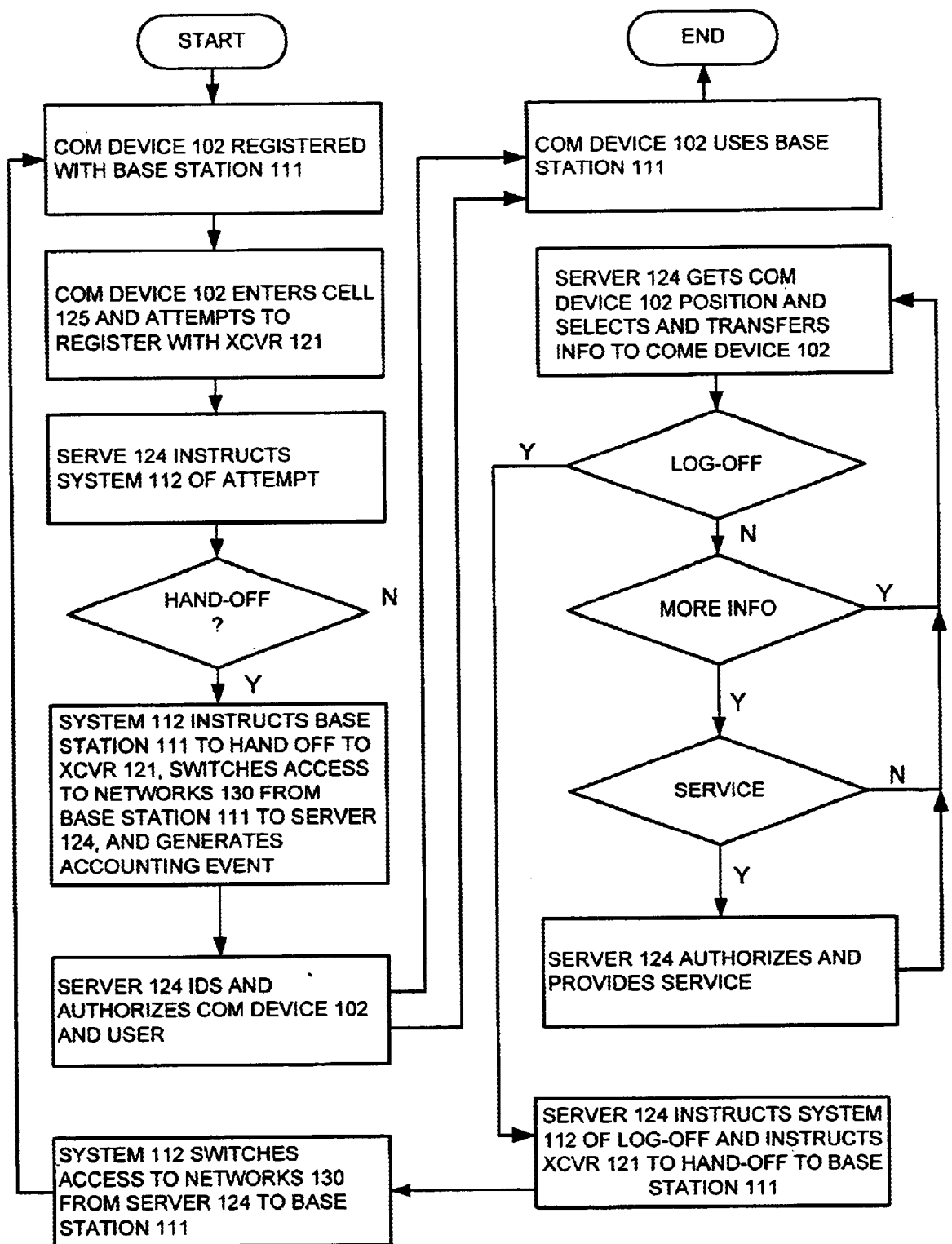
FIG. 2 is a flow diagram that illustrates wireless enterprise communications in an example of the invention.

Wireless Enterprise Communications—FIGS. 1–3

FIGS. 1–3 depict a specific example of a communication system in accord with the present invention. Those skilled in the art will appreciate numerous variations from this example that do not depart from the scope of the invention. Those skilled in the art will also appreciate that various features described below could be combined to form multiple variations of the invention.

FIG. 1 is a block diagram that illustrates a communication system 100 for wireless enterprise communications in an example of the invention. The communication system 100 comprises communication device 102, public network cell 110, enterprise 120, and networks 130. Public network cell 110 includes public network base station 111 and control system 112. Enterprise 120 includes transceivers 121–123, respective enterprise cells 125–127, and server 124.

Communication device 102 includes a public wireless communication interface and could comprise a telephone, portable computer, personal digital assistant, automobile system, or other similar device. The arrows on FIG. 1 indicate movement of communication device 102. Public network cell 110, base station 111, and control system 112 could comprise a conventional wireless system that is modified in accord with the invention. Control system 112 typically includes a Mobile Telephone Switching Office (MTSO). Networks 130 could comprise conventional systems such as the PSTN, Internet, and private data networks.

Enterprise 120 is an entity that is separate from the PSTN or Internet. Some examples of enterprise 120 include retail establishments, medical facilities, airports or train terminals, educational campuses, business campuses, government facilities, and recreational areas. For wireless communication and hand-offs, transceiver 121 operates similar to a conventional public network base station. Enterprise cell 125 is at least partially located in public network cell 110. Transceiver 121 receives a hand-off from public network base station 111 for wireless communication device 102 in response to wireless communication device 102 entering enterprise cell 125. Transceivers 121–123 communicate over the air interface with wireless communication device 102 when wireless communication device is in their respective enterprise cells 125–126. For example, transceiver 121 hands-off wireless communication device 102 to transceiver 123 in response to wireless communication device 102 moving from enterprise cell 125 to enterprise cell 127. Transceivers 122–123 interface with communication device 102 and server 124 similar to transceiver 121. Hand-offs occur between transceivers 121–123 as communication device 102 moves among the respective enterprise cells 125–127.

Server 124 exchanges information between enterprise 120 and wireless communication device 102 through the wireless transceiver 121 in response to the hand-off between base station 111 and transceiver 121. Server 124 identifies and authorizes communication device 102 and the user of communication device 102. Server 124 selects the information for the user based on the identity, position, and user of communication device 102, in addition to, user responses and requests.

The information exchange could be an enterprise 120 intranet session. The information may represent interactive enterprise menus, enterprise maps, product or person locators, product information, order and payment information, promotions, and media clips. Product information may indicate features and options, availability, and price. For example, the information might allow a user to select a product type, identify available products, compare available product features and prices, order and pay for a selected product, and locate where the purchased product can be picked-up.

The position of communication device 102 could be obtained through triangulation across transceivers or other techniques, such as satellite positioning. If server 124 selects the information based on the position of communication device 102, then the information may be related to promotions or products of proximate shops and restaurants.

Server 124 provides communication device 102 with access to networks 130 through transceivers 121–123 and control system 112. The access includes Internet access, PSTN access, private data network access. The access could be continuous during any hand-offs.

FIG. 2 is a flow diagram that illustrates wireless enterprise communications in an example of the invention. Wireless communication device 102 is registered with public network base station 111 in public network cell 110. Wireless communication device 102 enters enterprise cell 125 and attempts to register with transceiver 121. Server 124 informs control system 112 of the attempt. Control system 112 determines whether to hand-off communications device 102 to enterprise 120. The determination could be based on system capacity, device ID, user ID, user prompt and response, signal strength, services in use, error rates, or other such criteria. If the determination is negative, then wireless communication device 102 continues to use public network base station 111 in public network cell 110. If the determination is positive, then control system 112 instructs public network base station 111 to hand-off wireless communication device 102 to enterprise transceiver 121. Control system 112 switches access between wireless communication device 102 and networks 130 from base station 111 to server 124, so sessions are continuous through the hand-off.

In response to the hand-off, control system 112 generates an accounting event for the access switch noting communication device 102, services invoked, and the time, so billing for wireless communication device 102 is properly tracked between communication system 100 and enterprise 120. Numerous billing schemes could be implemented in this fashion. Communication system 100 may bill enterprise 120, and not the user, for access after the switch. Communication system 100 may bill the user at a reduced rate for access after the switch. Enterprise 120 may bill the user for access after the switch. Enterprise 120 could offer promotions to discount or forgive this bill based on user activity within the enterprise, such as money spent, time spent, or services used. Enterprise 120 may bill communications system 100 for access after the switch. Reciprocal billing schemes could be implemented on a hand-off from enterprise 120 to public network cell 110.

Server 124 identifies and authorizes communication device 102 and its user. Server 124 gets the position of wireless communication device 102 within enterprise 120 and selects and transfers information to wireless communication device 102. If the user logs-off, then server 124 instructs control system 112 of the log-off and instructs transceiver 121 to hand-off wireless communication device 102 to public network base station 111. Control system 112 switches access between wireless communication device 102 and networks 130 from transceiver 121 back to public network base station 111.

If the user does not log-off, but requests more information, then server 124 transfers the additional information to wireless communication device 102. If the user does not log-off or request more information, but requests a service, then server 124 authorizes and provides the service. Server 124 repeatedly gets the position of wireless communication device 102 within enterprise 120 and selects and transfers information to wireless communication device 102 based on the position. In some examples, server 124 reports the position of wireless communication device to control system 112. Log-off may also occur automatically if communication device 102 is not detected within enterprise 120 for a specified time period.

FIG. 3 is a table diagram that illustrates a data structure 324 for wireless enterprise communications in an example of the invention. Server 124 houses and maintains data structure 124. Data structure 124 is populated with data related to device position, device ID, user ID, information code, information time-out, user responses, and services invoked. Data structure 124 could also include other information, such as device type, error rate, jitter, media security, encryption, and static presence. Asterisks indicate wildcards. At position X1Y1, any device or user is provided with information for code 100 for two minutes. Code 100 could be a main menu for enterprise 120. If the user responds with selection "A", an enterprise map service is provided. Device 7020 receives different information based on whether the user is Bill or Ann. Bill obtains a movie list while Ann obtains sales promotions. At position X2Y2, any device or user is provided with information for code 203 for two minutes. Position X2Y2 could be proximate to a food court and code 203 could be a selection of restaurants. If the user responds with selection "A", then a menu for the selected restaurant is provided. Regardless of device or position, Jim gets a continuous security service. Regardless of position or user, device 8432 gets continuous web access, and device 8458 gets continuous PSTN access.

Wireless Transceiver Configuration and
Management—FIGS. 4–8

FIGS. 4–8 depict a specific example of a communication system in accord with the present invention. Those skilled in the art will appreciate numerous variations from this example that do not depart from the scope of the invention. Those skilled in the art will also appreciate that various features described above and below could be combined to form multiple variations of the invention.

Figure 4:
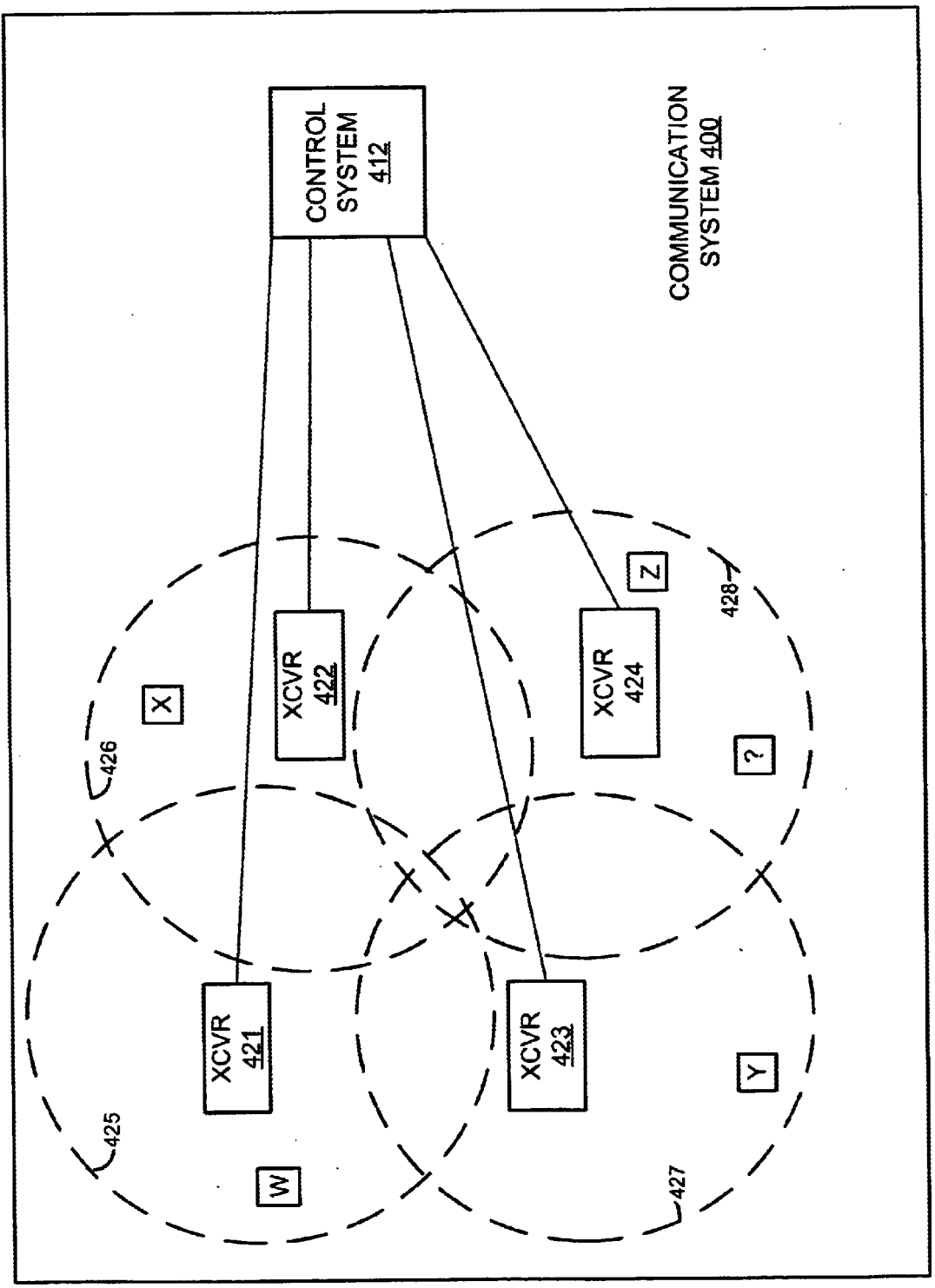
FIG. 4 is a block diagram that illustrates a communication system with wireless transceiver configuration and management in an example of the invention.

FIG. 4 is a block diagram that illustrates communication system 400 with wireless transceiver configuration and management in an example of the invention. Communication system 400 comprises control system 412, wireless transceivers 421–424, and respective cells 425–428. Receivers W, X, Y, and Z are shown along with an unknown transmitter indicated by the question mark. Wireless transceivers 421–424 could comprise an enterprise or could each comprise an individual enterprise or residence.

Figure 5:
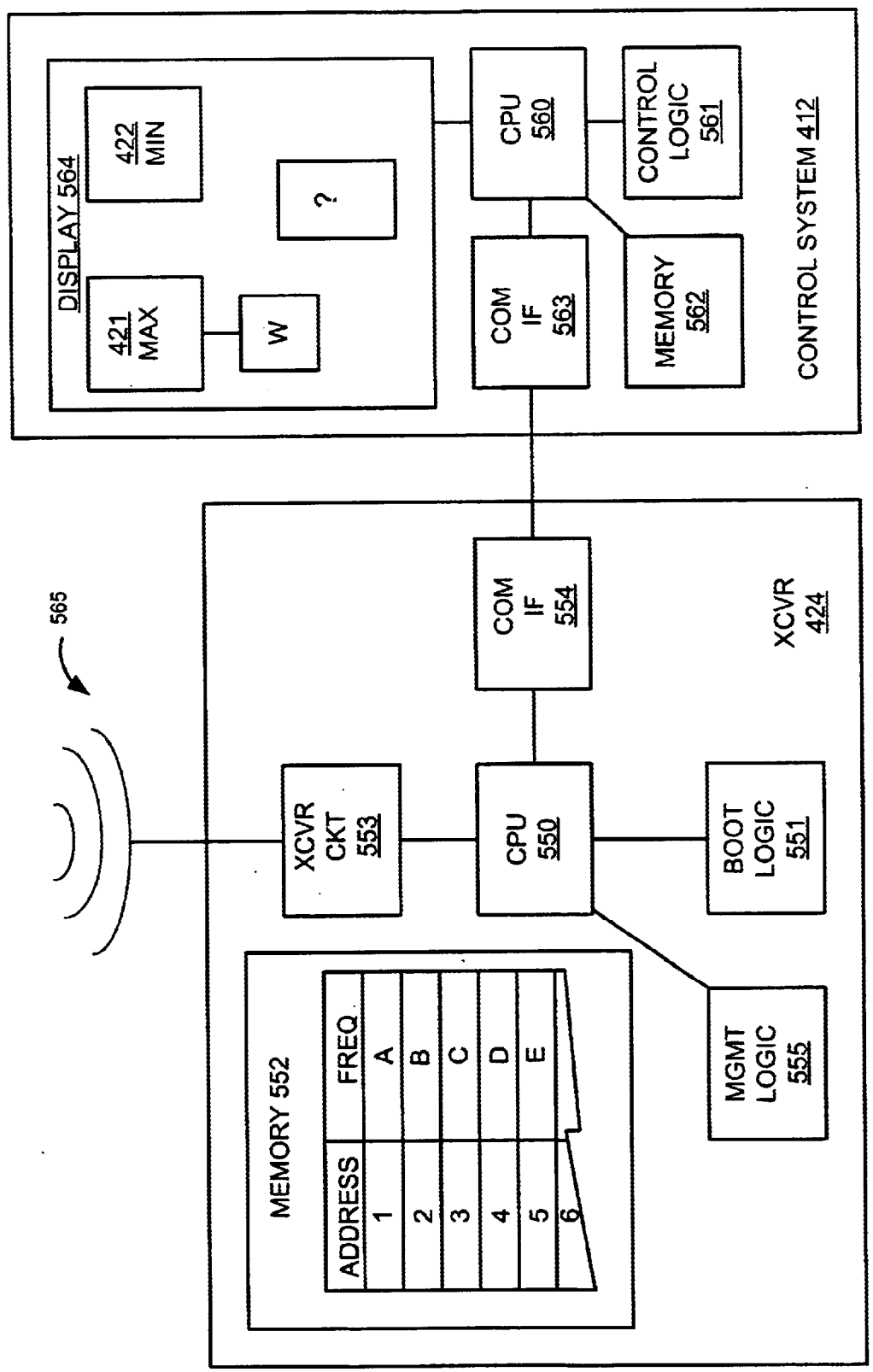
FIG. 5 is a block diagram that illustrates a wireless transceiver and control system with wireless transceiver configuration and management in an example of the invention.

FIG. 5 is a block diagram that illustrates wireless transceiver 424 and control system 412 in an example of the invention. Wireless transceiver 424 comprises central processing unit 550 coupled to boot logic 551, memory 552, transceiver circuits 553, communication interface 554, and management logic 555. Control system 412 comprises central processing unit 560 coupled to control logic 661, memory 562, communication interface 563, and display 564. Communication interface 554 is coupled to communication interface 563, although transceiver 424 and control system 412 could communicate over a wireless link. Memory 552 includes memory addresses and associated frequencies.

Figure 6:
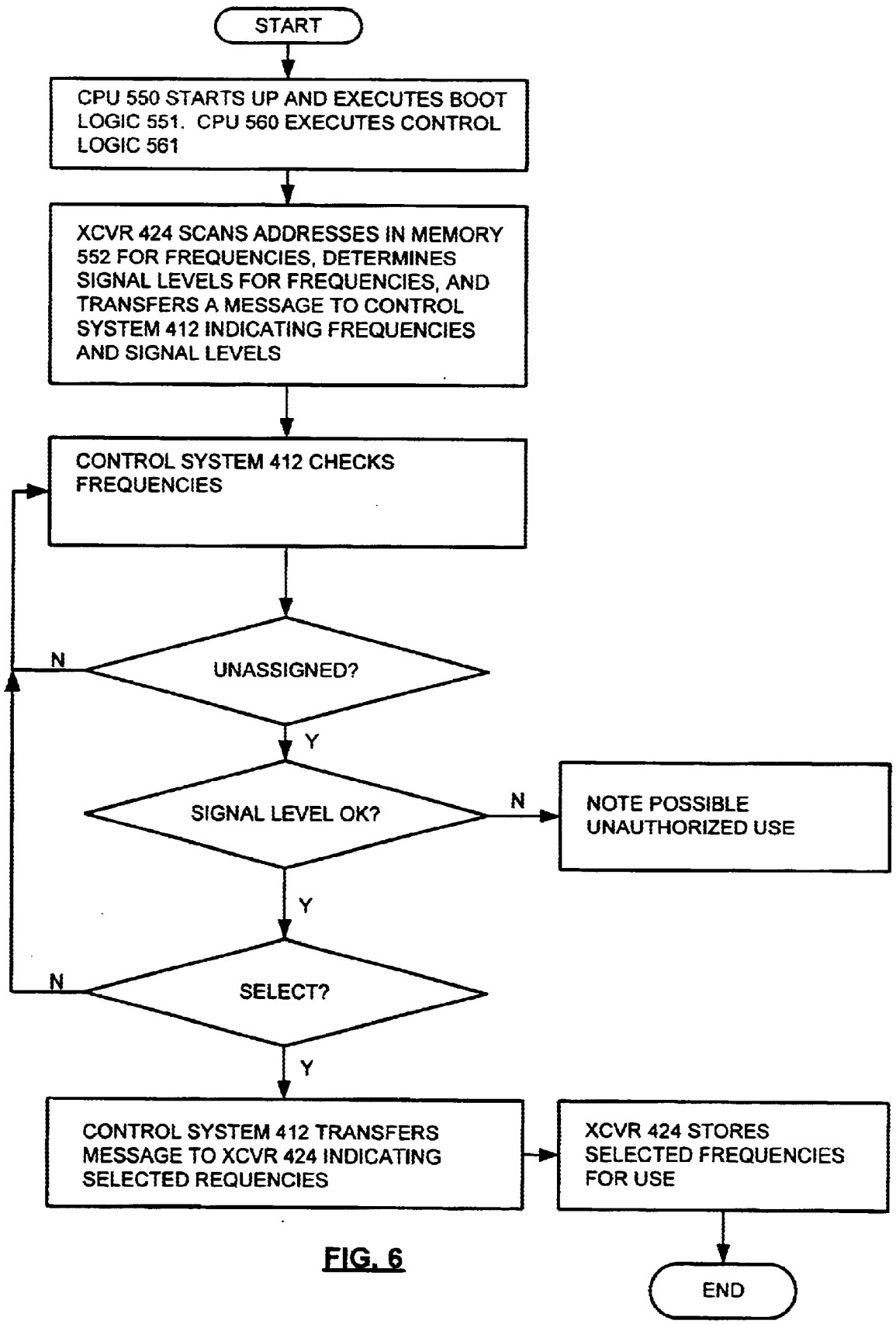
FIG. 6 is a flow diagram that illustrates wireless transceiver configuration in an example of the invention.

FIG. 6 is a flow diagram that illustrates wireless transceiver configuration in an example of the invention. At start-up, CPU 550 executes boot logic 551 which directs transceiver 424 to perform the following operations. CPU 550 scans addresses in memory 552 that are associated with frequencies. The frequencies may be represented by codes, and the term "frequency" includes a single frequency, a code that is associated with a frequency, or a frequency range. In response to the scan, CPU 550 uses transceiver circuit 553 to detect signals 565 and determine signal levels for the frequencies. CPU 550 transfers a first message indicating the signal levels for the frequencies through communication interface to control system 412.

Communication interface 563 receives the first message and forwards it to CPU 560. CPU 560 executes control logic 561 which directs control system 412 to perform the following operations. CPU 560 checks each frequency for an assignment to another transceiver. CPU 560 checks the signal levels at the unassigned frequencies. CPU 560 selects a set of unassigned frequencies without significant signal interference for assignment to transceiver 424. CPU 560 also notes any unassigned frequencies with significant signal levels for possible unauthorized use. CPU transfers a second message to transceiver 424 through communication interface 563. Communication interface 554 receives the second message and forwards it to CPU 550. CPU 550 stores the selected set of frequencies for subsequent wireless communication. The selected set of frequencies may include only one frequency.

Figure 7:
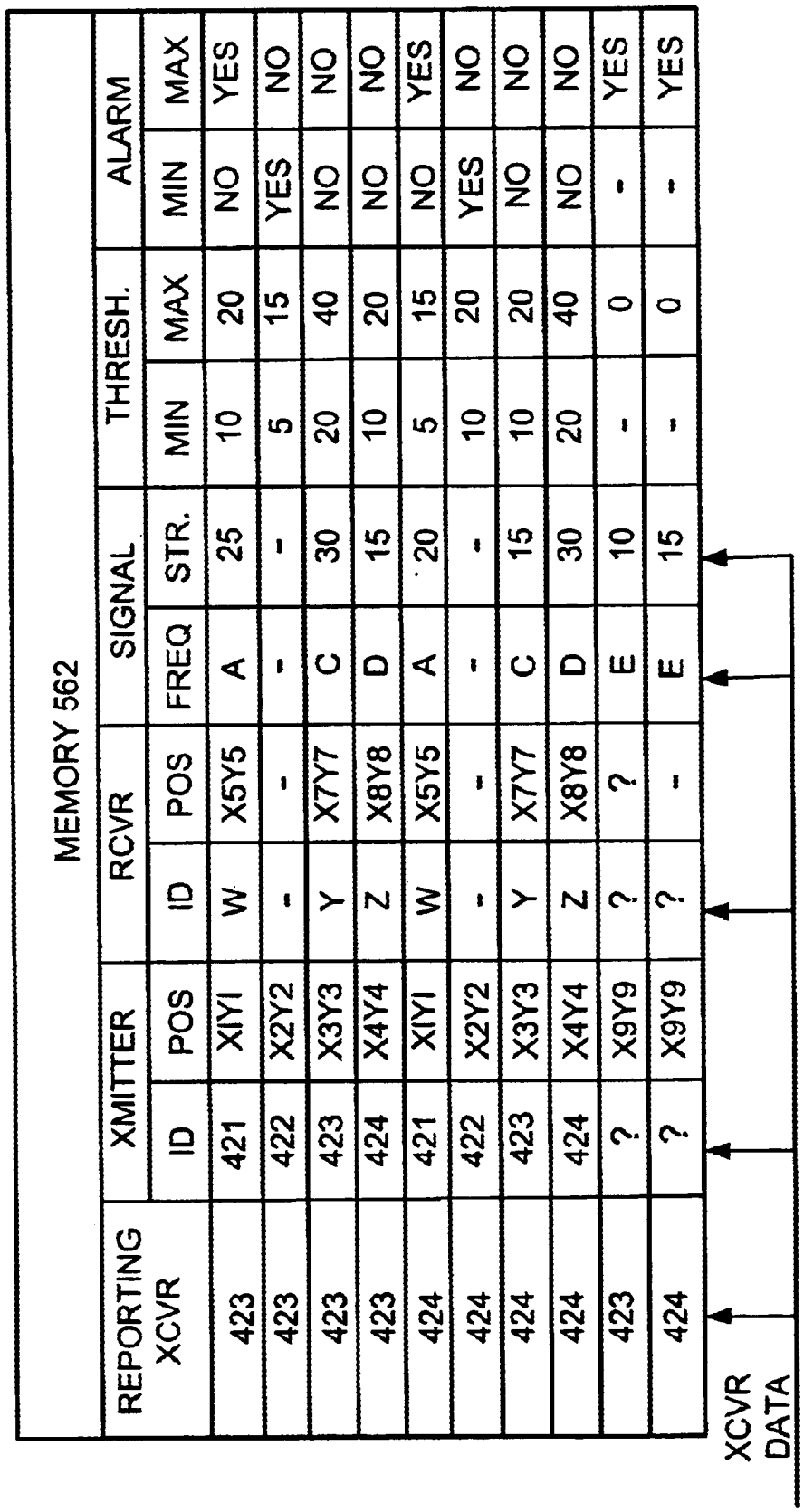
FIG. 7 is a table diagram that illustrates a data structure for wireless transceiver management in an example of the invention.

FIG. 7 is a table diagram that illustrates a data structure for wireless transceiver management in an example of the invention. CPU 560 maintains the data structure in memory 562. The data structure contains transceiver data from transceivers 421–424 and lists the transceiver that reports the data. The data structure includes transmitter ID and position, receiver ID and position, signal frequency and strength, minimum and maximum signal strength thresholds, and alarms. Alarm signals are generated by comparing signal strength to the minimum and maximum thresholds. The data structure shows an alarm that transceiver 421 is exceeding a maximum signal strength threshold. The data structure shows an alarm that transceiver 422 is below a minimum signal strength threshold. The data structure also shows an alarm that an unknown transmitter at position X9Y9 is using frequency E.

Figure 8:
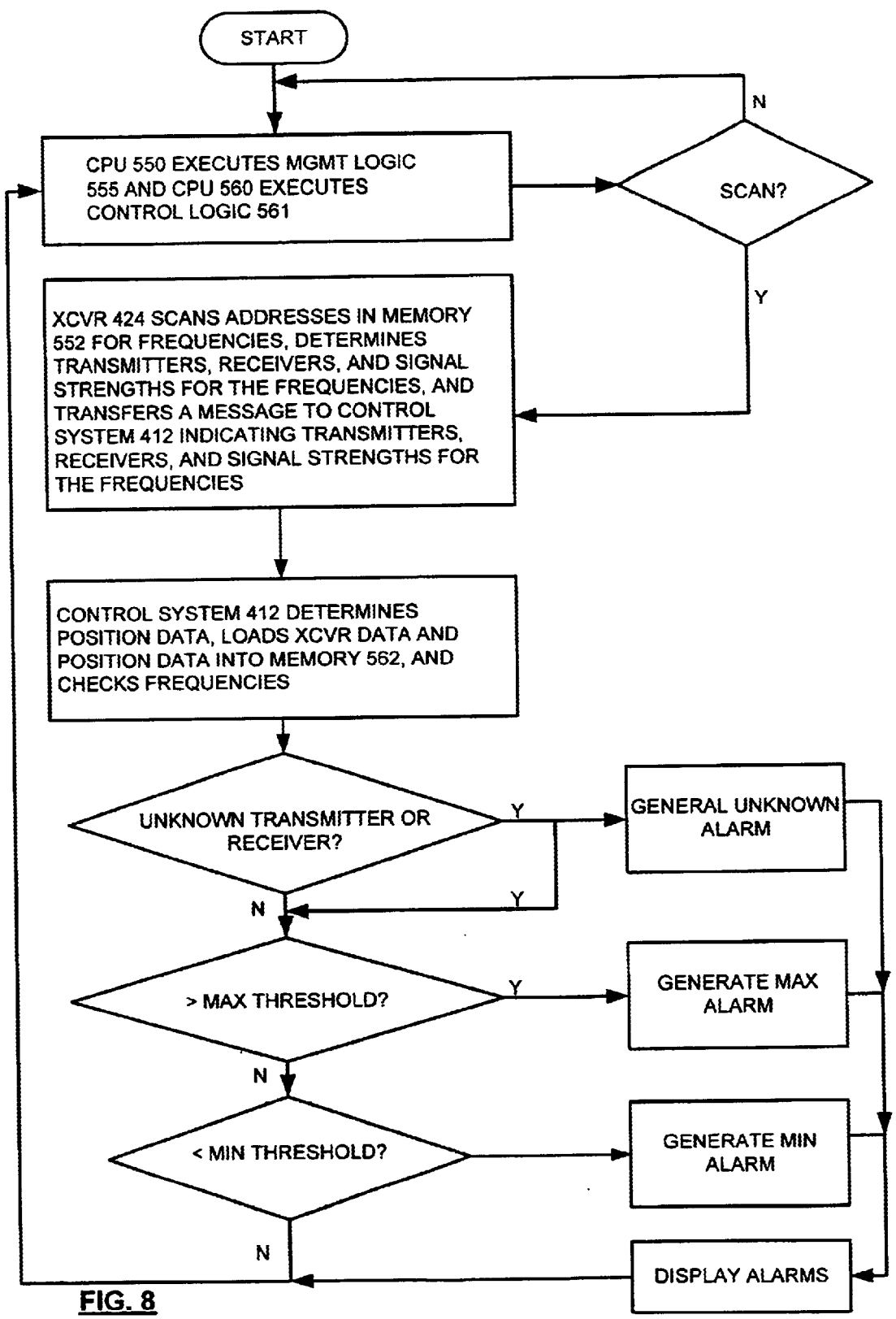
FIG. 8 is a flow diagram that illustrates wireless transceiver management in an example of the invention.

FIG. 8 is a flow diagram that illustrates wireless transceiver management in an example of the invention. CPU 550 executes management logic 555 and CPU 560 executes control logic 561 which respectively direct transceiver 424 and control system 412 to perform the following operations. Periodically, CPU 550 scans addresses in memory 552 that are associated with frequencies. In response to the scan, CPU 550 uses transceiver circuit 553 to detect signals 565 and determine transmitters, receivers, and signal levels for the frequencies. CPU 550 transfers a message to control system 412 through communication interface 554 indicating the transmitters, receivers, and signal levels for the frequencies. Transceivers 421–423 perform a similar operation. Communication interface 563 receives the messages and forwards them to CPU 560.

CPU 560 loads the transceiver data into the data structure within memory 562. CPU 560 also determines positions, possibly using a triangulation technique, and loads the position data into the data structure within memory 562. CPU 560 checks for unknown transmitters or receivers to generate alarms. CPU 560 compares signal levels to maximum and minimum thresholds to generate maximum and minimum alarms. CPU 560 sends signals display 564 to display the alarms. Display 564 shows that transceiver 421 at position X1Y1 has exceeded the maximum threshold. Display 564 shows that transceiver 422 at position X2Y2 is below the minimum threshold. Display 564 shows that an unknown transmitter at position X9Y9 is unauthorized.

Figure 9:
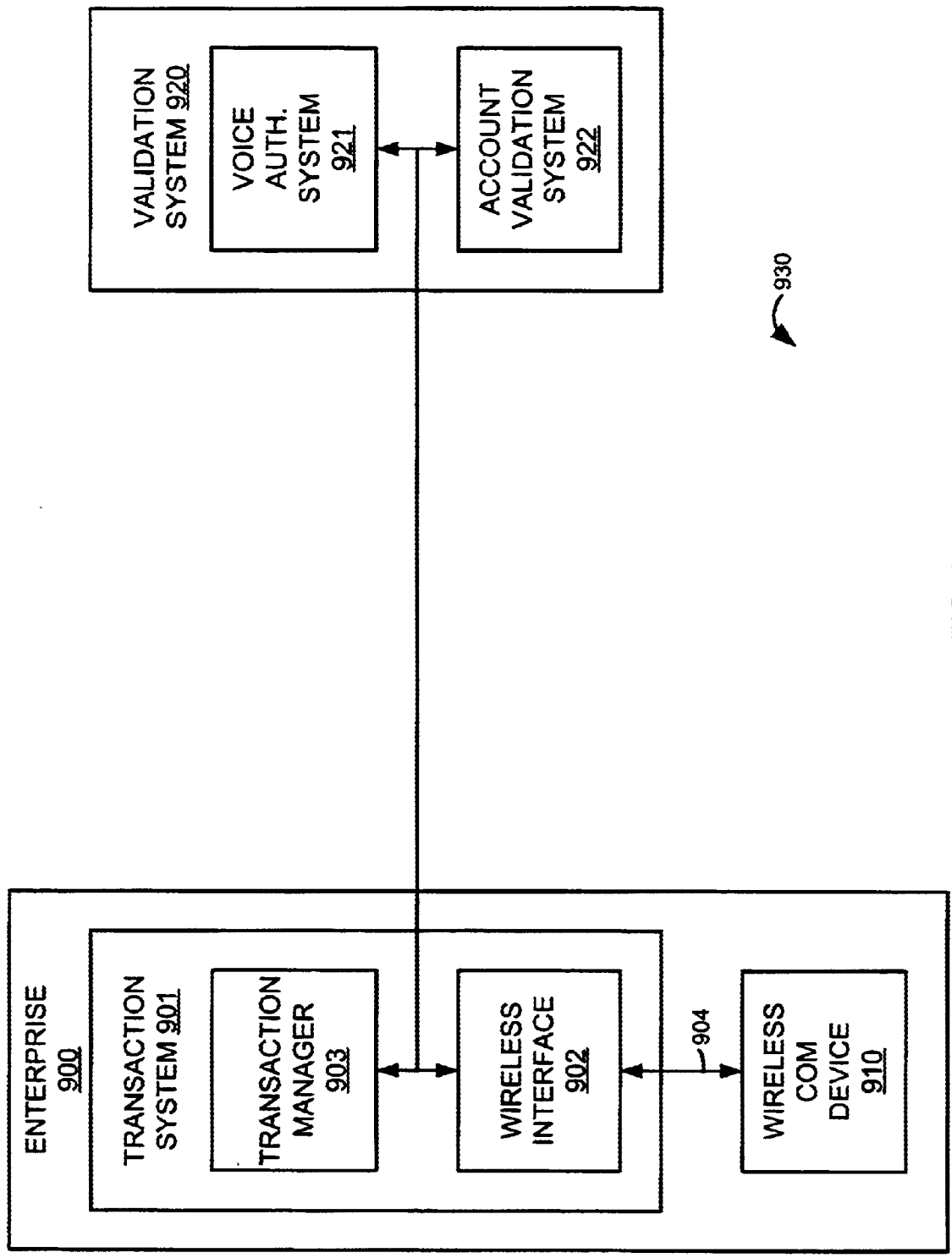
FIG. 9 is a block diagram that illustrates a system for wireless voice authentication and transaction validation in an example of the invention.
Figure 10:
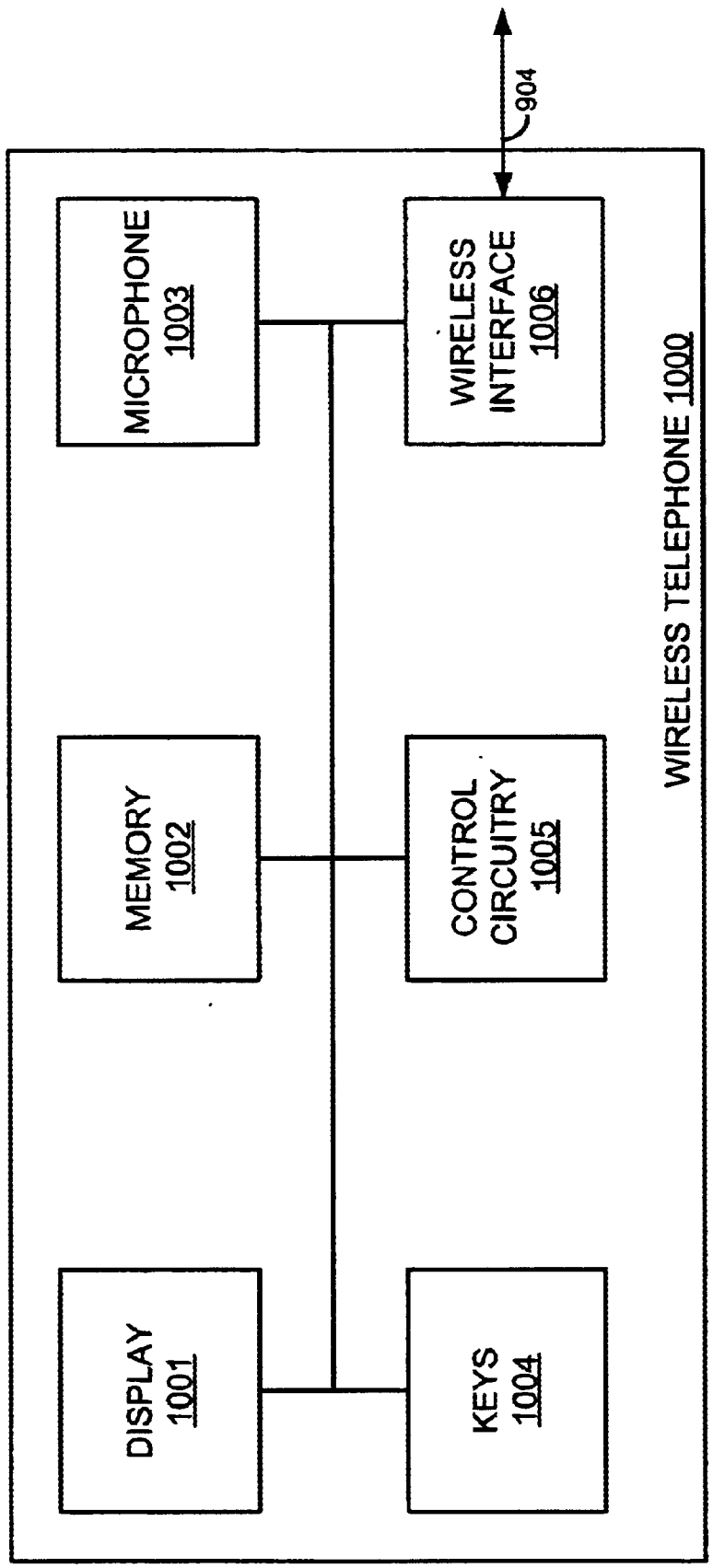
FIG. 10 is a block diagram that illustrates wireless telephone in an example of the invention.

Wireless Voice Authentication and Transaction Validation—FIGS. 9–10

FIGS. 9–10 depict a specific example of wireless voice authentication and transaction validation in accord with the present invention. Those skilled in the art will appreciate numerous variations from this example that do not depart from the scope of the invention. Those skilled in the art will also appreciate that various features described below could be combined to form multiple variations of the invention.

FIG. 9 is a block diagram that illustrates system 930 for wireless voice authentication and transaction validation in an example of the invention. The transaction could be the purchase of a product using an account number. The account number could be a credit account number or a bank account number.

System 930 comprises transaction system 901 that is within enterprise 900 and that is coupled to validation system 920. Transaction system 901 comprises wireless interface 902 and transaction manager 903. Validation system 920 comprises voice authentication system 921 and account validation system 922. Wireless communication device 910 is operated by a user and communicates with wireless interface 902 over wireless communication link 904. Communications over wireless link 904 and between systems 901 and 920 could be encrypted.

Enterprise 900, wireless interface 902, and wireless communication device 910 could be respectively similar to the enterprises, wireless transceivers, and wireless communication devices of FIGS. 1–8. Transaction manager 903 could be integrated into the servers or control systems of FIGS. 1–8. Wireless interface 902 and transaction manager 903 could also be implemented within a point-of-sale terminal. Wireless communication device 910 could be a wireless telephone configured to communicate with a public wireless network.

In operation, wireless communication device 910 and wireless interface 902 establish wireless communication link 904. Wireless interface 902 receives user information including a user speech sample and a user account code from wireless communication device 910 over wireless communication link 904. Wireless interface 902 transfers the user information to transaction manager 903.

Transaction manager 903 transfers the user speech sample to voice authentication system 921. Voice authentication system 921 compares the user speech sample to a previous speech sample from the user. Voice authentication system 921 generates validation information to indicate if the user is authentic based on the comparison. Voice authentication system 921 may also retrieve a picture of the user and include the picture in the validation information. Voice authentication system 921 transfers the validation information to transaction manager 903.

Transaction manager 903 receives the validation information from voice authentication system 921, and if the validation information indicates that the user is authentic, then transaction manager 903 transfers the account code to account code validation system 922. Although, the account code validation is conditional on user authentication in this example, authentication and validation could be flip-flopped in time, or they could occur in parallel.

Account code validation system 922 processes the user account code to generate validation information that indicates if the user account code is valid. Account code validation system 922 may also retrieve a picture of the user and include the picture in the validation information. Account code validation system 922 may also retrieve transaction requirements for a valid transaction, such as permitted transactions and purchase amounts, and include the transaction requirements in the validation information. Account code validation system 922 transfers the validation information to transaction manager 903. Transaction manager 903 receives and displays the validation information. Transaction manager 903 may also validate the transaction based on the validation information.

FIG. 10 is a block diagram that illustrates wireless telephone 1000 in an example of the invention. Wireless telephone 1000 is an example of wireless communication device 910 in FIG. 9. Wireless telephone 1000 comprises display 1001, memory 1002, microphone 1003, keys 1004, control circuitry 1005, and wireless interface 1006. FIG. 10 has been simplified for clarity, and those skilled in the art will appreciate that some conventional aspects of wireless telephone 1000 have been omitted or simplified.

Wireless telephone 1000 is configured to operate as follows. Memory 1002 stores a list of user account codes. Control circuitry 1005 directs display 1001 to display a user prompt for a voice-authenticated transaction. In response to a user selection from keys 1004 for a voice-authenticated transaction, control circuitry 1005 directs display 1001 to display a user prompt to select an account code from the list of user account codes. In response to a user selection from keys 1004 of the user account code, control circuitry 1005 directs display 1001 to display a user prompt for a user speech sample.

Microphone 1003 receives the user speech sample. Control circuitry directs the wireless interface 1006 to transfer the user speech sample and the account code to wireless interface 902 in transaction system 901 over wireless communication link 904. Wireless interface 1006 encrypts and transfers the user speech sample and the account code as directed.

After the transaction, wireless interface 1006 receives a transaction code, product identification, and purchase price for the transaction. Control circuitry 1005 directs memory 1002 to store the transaction code, product identification, purchase price, and date for the transaction. Control system 1005 also directs memory 1002 to store an account balance for the account code.

The above-described control, logic, and data structures are comprised of instructions that are stored on storage media. The instructions can be retrieved and executed by a processor. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Those skilled in the art will appreciate variations of the above-described embodiments that fall within the scope of the invention. As a result, the invention is not limited to the specific examples and illustrations discussed above, but only by the following claims and their equivalents.

I claim:

1. A method of handling a transaction for a user, the method comprising:

receiving user information including a user speech sample and a user account code into a transaction system from a wireless communication device over a wireless communication link;

transferring the user speech sample and the user account code from the transaction system to a validation system including transferring the user speech sample from the transaction system to a voice authentication system;

receiving validation information indicating if the user is authentic and if the account code is valid into the transaction system from the validation system including receiving a first portion of the validation information indicating if the user is authentic into the transaction system from the voice authentication system;

if the first portion of the validation information indicates that the user is authentic, then transferring the account code from the transaction system to an account code validation system and receiving a second portion of the validation information indicating if the account code is valid into the transaction system from the account code validation system; and displaying the validation information in the transaction system.

2. The method of claim 1 wherein the validation information includes a picture of the user and further comprising, in the transaction system, displaying the picture.

3. The method of claim 1 wherein the account number comprises one of a credit account number or a bank account number and the transaction is a purchase using the account number.

4. The method of claim 1 further comprising, in the transaction system, validating the transaction based on the validation information.

5. The method of claim 1 further comprising, in the voice authentication system, comparing the user speech sample to a previous speech sample from the user and generating the validation information to indicate if the user is authentic based on the comparison.

6. The method of claim 1 further comprising, in the account code validation system, processing the user account code and generating the validation information to indicate if the user account code is valid based on the processing.

7. The method of claim 1 further comprising, in the validation system, retrieving transaction requirements for a valid transaction and including the transaction requirements in the validation information.

8. The method of claim 1 further comprising, in the validation system, retrieving a picture of the user, and including the picture in the validation information.

9. The method of claim 1 further comprising establishing the wireless link with the wireless communication device.

10. The method of claim 1 wherein receiving the user information comprises receiving the user information in encrypted form over the wireless link.

11. The method of claim 1 wherein receiving the user information comprises receiving the user information from a wireless telephone configured to communicate with a public wireless network.

12. The method of claim 1 further comprising, in the wireless communication device, providing a prompt for a voice authenticated transaction.

13. The method of claim 1 further comprising, in the wireless communication device, storing the account code.

14. The method of claim 1 further comprising, in the wireless communication device, establishing the wireless communication link with the transaction system.

15. The method of claim 1 further comprising, in the wireless communication device, providing a prompt to select the user account code from a plurality of stored account codes.

16. The method of claim 1 further comprising, in the wireless communication device, encrypting the user information and transferring the user information in encrypted form over the wireless communication link.

17. The method of claim 1 further comprising, in the wireless communication device, storing a record of the transaction.

18. A system for handling a transaction for a user, the system comprising:

a wireless interface configured to receive user information including a user speech sample and a user account code from a wireless communication device over a wireless communication link; and a transaction manager coupled to the wireless interface and configured to transfer the user speech sample and the user account code to a validation system comprising a voice authentication system, receive a first portion of the validation information from the voice authentication system indicating if the user is authentic, transfer the account code to an account code validation system and receive a second portion of the validation information from the account code validation system indicating if the account code is valid, and display the validation information.

19. The system of claim 18 wherein the validation information includes a picture of the user and the transaction manager is configured to display the picture.

20. The system of claim 18 wherein the account number comprises one of a credit account number or a bank account number and the transaction is a purchase using the account number.

21. The system of claim 18 wherein the transaction manager is configured to validate the transaction based on the validation information.

22. The system of claim 18 further comprising the voice authentication system configured to compare the user speech sample to a previous speech sample from the user and generate the validation information to indicate if the user is authentic based on the comparison.

23. The system of claim 18 further comprising the account code validation system configured to process the user account code and generate the validation information to indicate if the user account code is valid based on the processing.

24. The system of claim 18 further comprising the validation system configured to retrieve transaction requirements for a valid transaction and include the transaction requirements in the validation information.

25. The system of claim 18 further comprising the validation system configured to retrieve a picture of the user and include the picture in the validation information.

26. The system of claim 18 wherein the wireless interface is configured to establish the wireless link with the wireless communication device.

27. The system of claim 18 wherein the wireless interface is configured to receive the user information in encrypted form over the wireless link.

28. The system of claim 18 wherein the wireless interface is configured to receive the user information from a wireless telephone configured to communicate with a public wireless network.

* * * * *